United States Patent [19]
McElroy et al.

[11] Patent Number: 4,657,829
[45] Date of Patent: Apr. 14, 1987

[54] FUEL CELL POWER SUPPLY WITH OXIDANT AND FUEL GAS SWITCHING

[75] Inventors: James F. McElroy, Hamilton; Paul J. Chludzinski, Swampscott; Philip Dantowitz, Peabody, all of Mass.

[73] Assignee: United Technologies Corporation, Hartford, Conn.

[21] Appl. No.: 453,249

[22] Filed: Dec. 27, 1982

[51] Int. Cl.[4] .............................................. H01M 8/06
[52] U.S. Cl. ........................................ 429/19; 429/21; 429/23
[58] Field of Search ....................... 429/12, 13, 14, 17, 429/19, 21, 25, 23; 204/DIG. 4

[56] References Cited
U.S. PATENT DOCUMENTS 3,180,813  4/1965  Wasp et al. ............................ 429/12
4,084,038  4/1978  Scragg et al. .......................... 429/17

Primary Examiner—Donald L. Walton
Attorney, Agent, or Firm—Alan C. Cohen; I. David Blumenfeld

[57] ABSTRACT

This invention relates to a fuel cell vehicular power plant. Fuel for the fuel stack is supplied by a hydrocarbon (methanol) catalytic cracking reactor and CO shift reactor. A water electrolysis subsystem is associated with the stack. During low power operation part of the fuel cell power is used to electrolyze water with hydrogen and oxygen electrolysis products being stored in pressure vessels. During peak power intervals, viz, during acceleration or start-up, pure oxygen and pure hydrogen from the pressure vessel are supplied as the reaction gases to the cathodes and anodes in place of air and methanol reformate. This allows the fuel cell stack to be sized for normal low power/air operation but with a peak power capacity several times greater than that for normal operation.

3 Claims, 2 Drawing Figures

FUEL CELL POWER SUPPLY WITH OXIDANT AND FUEL GAS SWITCHING

The Government has rights in this invention pursuant to contract number W-7405-ENG-36 awarded by the U.S. Department of Energy.

This invention relates to a fuel cell power supply for vehicular applications and, more particularly, to a hydrogen/air fuel cell which is switched to hydrogen/oxygen operation during peak power intervals.

Fuel cell stacks have drawn a great deal of attention recently as power sources for electrically driven vehicles. One of the formidable problems is designing a fuel cell stack for a vehicular power plant are the trade offs between size, complexity and cost as these are affected by the operational mode of the vehicle. From an economic standpoint the fuel cell stack should be designed and sized for normal power requirements. However, peak power requirements during start-up and acceleration, though of short duration may be several times the normal power requirements. It is necessary to provide the peak power without increasing cell or stack size and without requiring traction batteries.

Applicant has found that these conflicting requirements may be satisfied by providing a fuel cell stack which is operated in a hydrogen/air mode to supply the normal low power requirements of the vehicle. An electrolysis sub-system uses part of the power from the fuel cell stack during off-peak operation to electrolyze water and store oxygen and hydrogen. During conditions such as acceleration and start-up when peak power is required the fuel cell stack is switched to pure hydrogen and pure oxygen operation utilizing the stored oxygen and hydrogen from electrolyzer. In this fashion, the size of the fuel stack is consistent with the requirement for normal low power operation but it is capable of producing short intervals of peak power which is several times the magnitude of the power level during normal operation.

It is, therefore, a principal objective of this invention to provide a fuel cell power supply with oxidant and fuel supply switching during peak power operation.

A further objective is to provide a fuel cell power supply with an electrolysis system operated from the fuel cells to supply pure oxygen as the oxidant and pure hydrogen as fuel during peak power intervals.

Other objectives and advantages will become apparent with the description thereof.

The novel features which are believed to be characteristic of the invention are set forth with particularity in the appended claims. The invention itself, however, both as to its organization and method of operation together with further objectives and advantages thereof may best be understood by reference to the following description taken in connection with the accompanying drawings in which:

Figure 1:
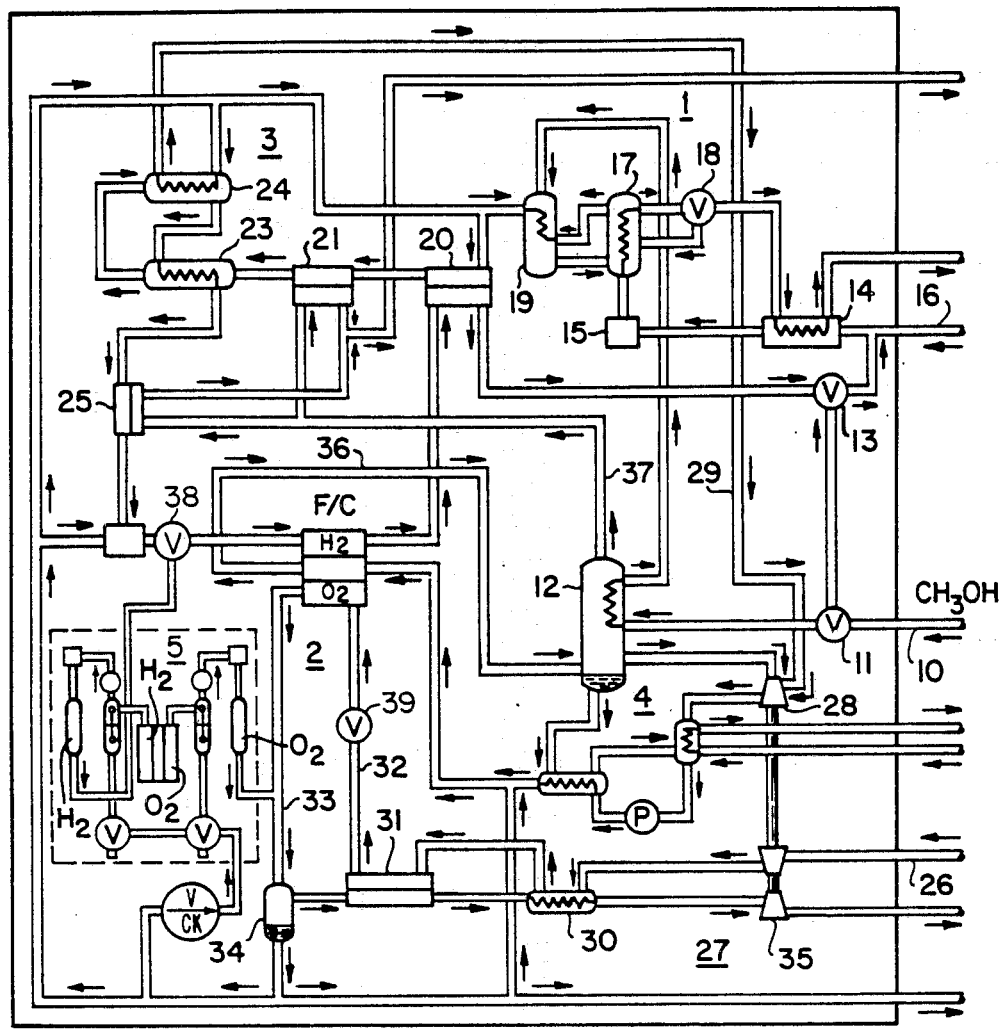
FIG. 1 is a schematic block diagram of the fuel cell system including the water electrolysis subsystem.

FIG. 1 shows a block diagram and flow chart for a methanol/air fuel cell assembly which includes a rapid start-up arrangement for the catalytic methanol cracking reactor and a water electrolysis system associated with the fuel cell to provide oxygen and hydrogen for peak power operation. The methanol/air fuel cell system illustrated in FIG. 1 comprises essentially five components. A catalytic cracking reactor 1 for converting a reformable organic fuel such as methanol to produce hydrogen as a fuel for a fuel stack cell 2. A CO shift reactor assembly 3 in which the hydrogen and carbon monoxide from the methanol cracking reactor is subjected to a water shift reaction to convert the carbon monoxide to carbon dioxide with the production of additional hydrogen. The output from the CO shift reactor 3 is then supplied as the fuel gas to the fuel cell stack 2. Waste heat from the fuel cell and the shift reactor is converted to steam which is utilized in a methanol vaporizer and in power generator assembly 4 to provide useful work in a mechanical compressor-expander which operates on the fuel cell reaction air. By thus utilizing the waste heat of the fuel cell stack by boiling water within the cell coolant chamber and utilizing the steam to vaporize methanol, and steam from the shift reactor exothermic reaction to provide useful work in the mechanical expander assembly, the efficiency of the overall vehicular power source is substantially enhanced.

An electrolyzer sub-system 5 is associated with fuel cell stack 2. Part of the power output from the fuel cell stack is used to electrolyze water during off-peak loads to produce oxygen and hydrogen which are stored in suitable pressure vessels. For start-up and peak power acceleration conditions pure oxygen instead of air is fed to the cell cathodes and pure hydrogen to the anodes. This eliminates the need for heavy traction batteries and permits the fuel cell stack to be sized for the lower continuous power requirement rather than for peak power. When the oxygen or hydrogen pressure reaches a predetermined pressure, viz, 600 psi or so, electrolyzing current is interrupted. During acceleration or upon start-up an outlet valves coupled to storage vessels are opened and permit flow of pure hydrogen through valve 38 and pure oxygen through valve 39 to the fuel cell anode and cathode chambers. The use of pure oxygen instead of air and pure hydrogen instead of the reformate fuel increases the cell reaction rate and the power output from the cell.

CATALYTIC METHANOL CRACKING REACTOR WITH RAPID START-UP

A reformable hydrocarbon fuel such as liquid methanol is introduced via an input line 10 to a start-up valve 11 which during normal operation passes the liquid methanol to a methanol vaporizer 12. During start-up valve 11 diverts the methanol through fuel control valve 13 to a pre-heater 14 and burner 15 to the methanol cracking reactor. The liquid methanol is combined with incoming combustion air over line 16 and introduced to the pre-heater 14. The methanol air mixture is maintained at a stoichiometric or preferably less than stoichiometric ratio to prevent excess oxygen from passing through the catalytic cracking reactor during start-up as the oxygen has a tendency to damage the catalytic pellets. By maintaining a lean or less than stoichiometric ratio of oxygen to methanol the excess unburned methanol can also be used in passing through the catalytic bed to produce the hydrogen and carbon monoxide which is passed to the CO shift reactor during start-up. Because the mixture is lean and has an oxygen content which may be less than the required stoichiometric ratio, it is necessary to preheat the air fuel mixture. The methanol-air combination is passed through the burner where it is burned to produce hot combustion gases which bring the catalytic cracking bed up to the temperature at which cracking reaction is initiated (~572° F.) by passing it through a flue chamber inside of the methanol cracking reactor 17. During start-up the hot flue gas is recirculated by cracking control valve 18 through the catalytic cracking bed itself. The flue gas thus heats the catalytic cracker both directly and indirectly. The carbon monoxide and hydrogen produced in catalytic cracker 17 by the reaction:

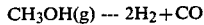

is then passed through a heating chamber 19. The heated reformate is passed through an anode exhaust dryer 20 which comprises a two chamber device separated by a water vapor transporting membrane. The heated reformate is passed into one chamber and humidified exhaust hydrogen gas from the anode chambers of the fuel cell stack is passed through the other chamber of the dryer. Water vapor from the anode exhaust is transported across the membrane to the higher temperature reformate stream thereby drying the hydrogen and partially humidifying the reformate. The dried hydrogen passes out of the chamber to preheater valve 13. Valve 13 is switched to feed excess H$_2$ from the fuel cell to the preheater and burner once the methanol catalytic cracking reactor comes up to operating temperature.

The partially humidified reformate gas stream from H$_2$ dryer 20 then passes to one chamber of a humidifer 21 which is of the same construction as that of the dryer. That is, it consists of two chambers separated by a membrane capable of transporting water from one stream to the other. The partially humidified reformate in one chamber absorbs water transported across the membrane from the other chamber to which steam from the fuel cell cooling chamber and methanol vaporizer chamber 12 is brought. The humidified reformate is introduced into a CO shift reactor preheater 23 and then into the CO shift reactor 24 where the combination of carbon monoxide and water undergo an exothermic "water shift" discussed previously in which carbon monoxide is converted to carbon dioxide and additional hydrogen is produced. Shift reactors of this type are well known and will not be described in detail here.

The temperature of the hydrogen and carbon dioxide from the shift reactor is quite high (~390° F.) because of the exothermic nature of the "water shift" reaction. The gases are passed through a flue chamber back in shift preheater 23 to heat the incoming humidified reformate. The hydrogen and carbon dioxide passes through anode humidifier 25 of the manner and type previously described in which the hydrogen fuel gas is humidified by means of steam from the vaporizor 12 passing through one of the chambers separated by the membrane and the humidifier. The output from the anode fuel gas humidifier is then passed through a gas conditioner into the anode chambers of fuel cell stack 2.

The fuel charge enters the fuel cell anode chamber which is separated from the cathode chamber by an ion transporting membrane having electrodes at opposite surfaces to produce electrical power. Fuel cells of the membrane type are well known devices and reference is hereby made to U.S. Pat. Nos. 3,134,697; 3,297,484; 3,392,058 and 3,432,355 all of which describe typical membrane fuel cells. As the hydrogen is used up in the anode chamber, water vapor condenses from the gaseous stream onto the membrane electrode assembly and is prototonically pumped across the membrane from the fuel side to the air side where it appears as liquid water. After the fuel exhaust stream leaves the anode chamber of the fuel cells it passes through anode exhaust dryer 20 to fuel control valve 13. During normal operation the exhaust H$_2$ is mixed with a stoichiometric (or slightly lean) air, preheated in preheater 14 and burned to form the hot flue gas during normal operation; flue gas which supports the cracking reaction. The flue gas, in normal operation, then leaves the cracking chamber through valve 18 to be exhausted overboard.

REACTION AIR PROCESSOR

Reaction air is brought in through an inlet conduit 26 to the compressor portion of a compressor-expander 27 which is part of a free piston compressor 28 to which steam from vaporizor 12 and excess steam from the CO water shift reactor 24 is supplied over line 29.

Reaction air for the cathode chambers of the fuel cells is compressed in the compressor portion. Some of the heat of expansion from the reaction air is removed in a reaction cooler 30 by heat exchanging with the exhaust air from the cathodes of the fuel cells. The reaction air is then humidified by absorbing water from the exhaust via water transport membranes in the exhaust air economizer 31. The water exchanger 31 is again a dual chamber arrangement with a water transporting membrane separating it into chambers with the humidified exhaust air passing through one chamber and the heated compressed reaction air passing through the other chamber. Water vapor is transported across the membrane from the exhaust air to the reaction air humidifying the same with the reaction air then being transported over conduit 32 and valve 39 to the cathodes of the fuel cell stack. It is not necessary to saturate the feed air completely since condensed water from the fuel side which is transported across the cell membranes and reaction product water formed at the cathode of the fuel cell produces enough water to saturate the air stream and prevent membrane drying. The air reacts in the air chambers and the saturated water vapor and may also carry liquid product water. This exhaust air is then fed via conduit 33 to a liquid/vapor separator 34 where the liquid water is separated from the exhaust air. The exhaust air then completes the path to the exhaust air water economizer 31 and cooler 30 and then to the expander 35 of the compressor expander combination 27.

The cooling system and waste heat conversion for the fuel cell stacks operates as follows. Liquid water enters cell and passes through the bipolar current collector between adjacent cells of the cell stack. Cooling water enters at a relatively high temperature, although below the boiling temperature. In passing through the cooling passages in the bipolar current collectors between cells the exhaust heat from the fuel cell evaporates the cooling water to steam. The steam exiting from the fuel cells is then transported via conduits 36 to methanol vaporizer 12 where it provides heat from methanol vaporization during normal operation. Some of the steam exits the vaporizer over line 37 and feeds humidifiers 25 and 21 of the fuel gas conditioning and CO shift reactor section. The remaining steam from the humidifier 20 which is generated by the exothermic reaction in the CO shift reactor 24 is fed to the free piston compressor and the compressor expander in section 4 to compress the reaction air.

ELECTROLYZER

Figure 2:
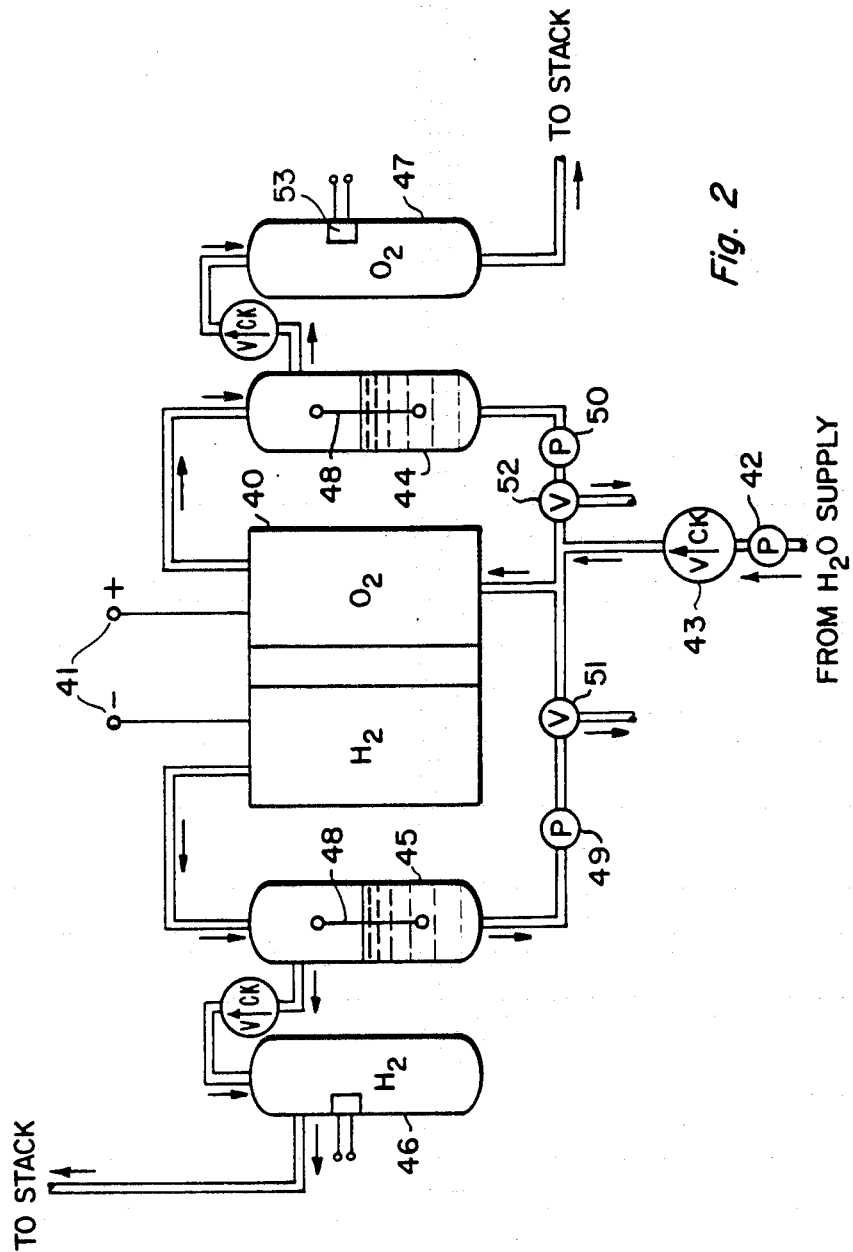
FIG. 2 is a schematic block diagram showing the electrolysis and gas storage system.

FIG. 2 illustrates the electrolyzer and gas storage subassembly associated with fuel cell stack 2. It comprises a plurality of bipolar cells shown at 40. Each of the cells comprises an anode and cathode chamber separated by an ion exchanging membrane having catalytic electrodes bonded to opposite sides thereof. Bipolar current collectors, not shown, are positioned between the anode and cathode electrodes of adjacent cells to the multi-cell electrolysis stack. The endplates of the stack are respectively connected through terminals 41 to the one portion of the fuel cell stack. The terminals are connected through relay contacts, not shown, so that power can be removed from the electrolysis stack during peak power operation and also when the stored oxygen reaches a predetermined pressure.

Water is introduced into the anode chambers of the electrolysis cells from liquid/vapor separator 34 of FIG. 1 through pump 42 and a check valve 43. The hydrogen and oxygen from the cell are fed to liquid/vapor separators 44 and 45. Excess water from the anode chamber and water pumped prototonically across the membrane with the with the hydrogen ions is separated from the gases with the gases being introduced into their respective pressurized storage vessels 46 and 47. Each of the separators contain a float switch 48 which actuates pumps 49 and 50 and drain valves 51 and 52 to stop pump 42 and circulates water from gas/water separators 44 and 45 to the electrolyzer when the water level is too high. Pressure transducers 53 are positioned in the oxygen and hydrogen storage pressure vessel. If the pressure in either vessel reaches a predetermined level, such as 600 psi the signal from the transducers actuates a relay switch, not shown, which interrupts the electrolyzing current supplied to terminal 41.

To meet acceleration or start-up peak power demands, oxidant switching valve 39 of FIG. 1 is actuated to switch oxidant flow to the cathodes from air flow to pure oxygen from pressure vessel 47 and pure hydrogen to the anodes through valve 38. Switching of valves 38 and 39 may be achieved in a variety of ways. It may be done electro-mechanically directly from the accelerator pedal of the vehicle or it may be done in response to an increase in current drawn from the cell stack in response to the peak power demands. As the oxygen and hydrogen in the pressure vessels are consumed, the pressure drops and the signal from the pressure transducers inactivate the switching relay permitting electrolizing current to be supplied to terminal 41 when the peak-power demand on the fuel cell stack ceases. Additional water is then electrolyzed to build the oxygen and hydrogen stored in the vessels to the desired level.

The humidifiers or water vapor transfer devices involve, as pointed out previously, are dual chamber devices with the chambers separated by polymeric membranes which are capable of transferring water vapor or liquid vapor from one chamber to the other thereby permitting humidification of one gas stream to another even though the total pressures of the streams may be different. The use of water and vapor transport membranes between the chambers to facilitate water exchange is most effective since it avoids the traditional approach of cooling one stream, condensing the water, separating the liquid water, adding it to the other stream and then heating to revaporize the water. The precise construction and method of operation of such a water vapor exchange and humidification device is specifically described and claimed in a copending application, Ser. No. 453,248 entitled, "Water Vapor Exchange System," filed Dec. 27, 1982, concurrently with this application in the names of Phillip Dantowitz, Paul J. Chludzinski and James F. McElroy and is assigned to the General Electric Company, the assignee of the present invention; the subject matter of which application is hereby specifically incorporated by reference.

It is obvious from the foregoing, that a fuel cell power system has been provided which is capable of operating at peak power loads although sized to operate normally at lower power loads.

While the instant invention has been shown in connection with certain preferred embodiments thereof and certain preferred processes for achieving the end result, the invention is by no means limited to these embodiments or these procedural sequenses since other modifications of the instrumentalities employed and of the steps of the process may be made still fall within the scope of the invention. It is contemplated by the appended claims to cover any such modifications that fall within the true scope and spirit of this invention.

What we claim is new and desire to be secured by Letters Patent of the United States is:

1. A continuously operable fuel cell power system operating with reformate hydrogen as the fuel gas and air as an oxidant gas during normal power intervals and including oxidant and fuel gas switching for operating with pure hydrogen and pure oxygen during peak power intervals comprising:
   (a) a fuel cell stack,
   (b) means for providing reformate hydrogen as a fuel gas to said stack including means for converting a hydrocarbon to produce hydrogen fuel gas,
   (c) means for supplying air as an oxidant gas for said fuel cell stack,
   (d) means for switching the fuel and oxidant gases supplied to said fuel stack from reformate hydrogen and air to pure oxygen as an oxidant and pure hydrogen as a fuel gas whenever the power demands from said stack exceeds a predetermined level including:
      1. an electrolysis stack for electrolyzing water to produce pure hydrogen and pure oxygen,
      2. means to supply an electrolysis current to said electrolysis stack from a portion of said fuel cell stack when the power demand from said stack is below said predetermined level,
      3. means to store said oxygen and hydrogen from said electrolyzer,
      4. means responsive to the power output level from said fuel cell stack for interrupting flow of air and reformate hydrogen fuel gas to said fuel stack and means for supplying pure oxygen and pure hydrogen from said storage means to at least a portion of said fuel cell stack when power demand from said fuel cell stack exceeds said predetermined level.

2. The fuel cell power system according to claim 1 including means to interrupt electrolysis current from the fuel cell stack when the power demand from the fuel cell stack exceeds the predetermined level.

3. The fuel cell power system according to claim 2 including means to terminate electrolysis current from the fuel cell stack whenever the pressure of the stored oxygen reaches a predetermined pressure.

* * * * *